United States Patent [19]

Anizan

[11] 4,032,721
[45] June 28, 1977

[54] STORED PROGRAM LOGIC SYSTEM USING A COMMON EXCHANGE CIRCUIT

[75] Inventor: Pierre Anizan, Paris, France

[73] Assignee: Telefonaktiebolaget L M Ericsson, Stockholm, Sweden

[22] Filed: Dec. 29, 1975

[21] Appl. No.: 645,272

Related U.S. Application Data

[63] Continuation-in-part of Ser. No. 532,775, Dec. 16, 1974, abandoned, which is a continuation of Ser. No. 444,975, Feb. 22, 1974, abandoned, which is a continuation of Ser. No. 324,794, Jan. 18, 1973, abandoned, which is a continuation of Ser. No. 190,043, Oct. 18, 1971, abandoned.

[30] Foreign Application Priority Data

Oct. 22, 1970 France .............................. 70.38221

[52] U.S. Cl. .......................................... 179/18 ES
[51] Int. Cl.² ........................................ H04Q 3/54
[58] Field of Search ................................ 179/18 ES

[56] References Cited

UNITED STATES PATENTS

| | | | |
|---|---|---|---|
| 3,626,105 | 12/1971 | DeJean et al. | 179/18 ES |
| 3,760,364 | 9/1973 | Yamauchi et al. | 340/172.5 |
| 3,812,297 | 5/1974 | Borbas | 179/18 ES |
| 3,906,163 | 9/1975 | Brenski et al. | 179/18 ES |
| 3,930,146 | 12/1975 | Bogacz | 235/153 AK |

Primary Examiner—Thomas W. Brown
Attorney, Agent, or Firm—Hane, Sullivan & Spiecens

[57] ABSTRACT

A stored program logic system for use in a telephone central office of the space switching type connected to peripheral units includes: a data memory divided into areas, a computer assemblage with a program memory; and separate linking circuits connected to respective peripheral units. A common exchange circuit interconnects the data memory, the computer assemblage and the linking circuits.

1 Claim, 6 Drawing Figures

STORED PROGRAM LOGIC SYSTEM USING A COMMON EXCHANGE CIRCUIT

CROSS-REFERENCE TO RELATED APPLICATIONS

This invention is a continuation-in-part application of Ser. No. 532,775 of Dec. 16, 1974 and now abandoned, which in turn is a continuation of application Ser. No. 444,975 of Feb. 22, 1974, now abandoned, which in turn is a continuation of application Ser. No. 324,794 of Jan. 18, 1973 and now abandoned, which in turn is a continuation of application Ser. No. 190,043 of Oct. 18, 1971, now abandoned.

BACKGROUND OF THE INVENTION

The present invention relates to an electronic logic arrangement with a stored program which can be used in private or public telephone central offices of the space switching type.

In a telephone central office having a memory with stored program and space switching, the logic arrangement may monitor equipments, said to be peripheral equipments, the function of which is to observe or modify the condition of the electronic or electromechanical binary elements used in telephony, such as, for example, relay contacts.

In present telephone central offices of the type described above, the function of the peripheral equipments is relatively reduced whereas most of the data processing required for operating is ensured by a logic system with a stored program. This is why, among other things, the drafting of programs is long and difficult. Programming is arduous because it has to include data about telephone operations, binary information attributed to each type of peripheral equipment and all transient or secondary data.

The logic system with stored program proposed in accordance with this invention overcomes these drawbacks by reducing the programming which no longer includes the processing of transient or secondary data and which provides separate routines for telephone operations and binary information attributed to each type of peripheral equipment.

The electronic logic with stored program contemplated by the present invention is essentially characterized by the fact that it combines:

a data memory divided into separate areas which can be linked to the peripheral equipments through linking circuits and through a common exchange circuit; and a program memory included in a computing assemblage and linked to the common exchange circuit through a test circuit and through the input-output registers of the computing assemblage.

In accordance with other characteristics of the invention:

the computing assemblage preferably also comprises an instruction memory linked to the latter by an addressing circuit which is also linked to the test circuit; and wherein the instruction memory preferably is also linked to an operating circuit which is linked to the said test circuit.

Other characteristics and advantages resulting from this invention will appear more clearly from the following detailed description taken in conjunction with the accompanying drawings in which:

DESCRIPTION OF PREFERRED EMBODIMENT

Figure 1:
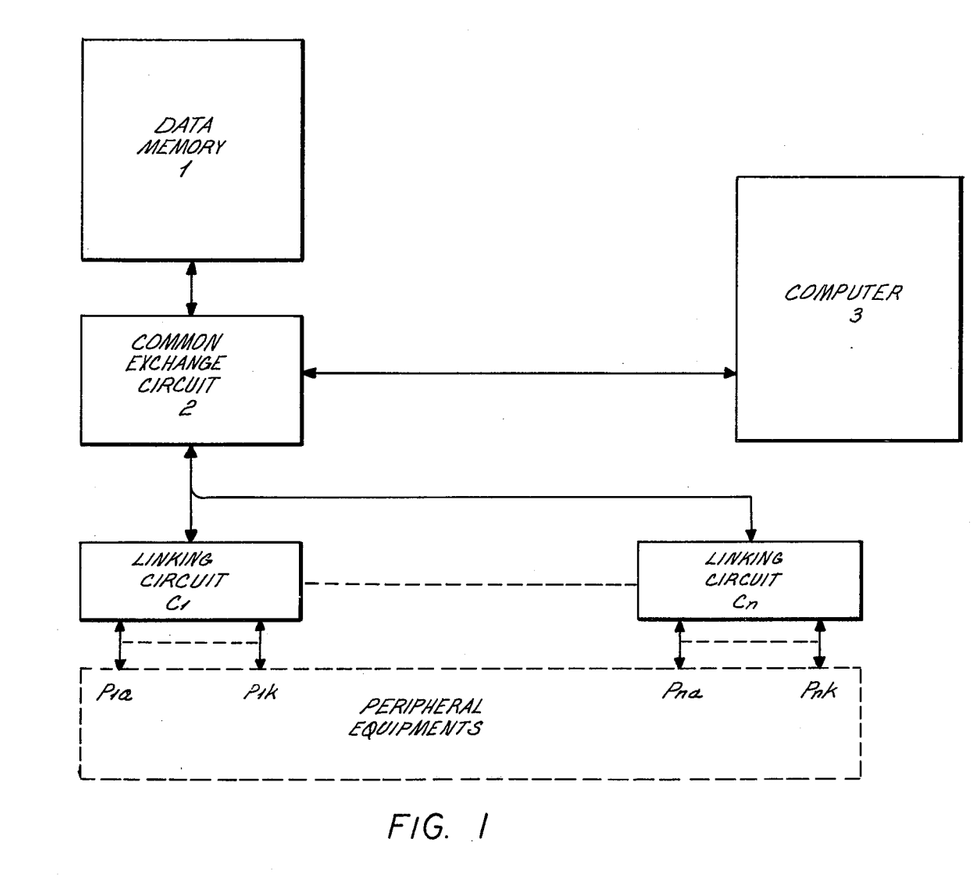
FIG. 1 shows schematically, by way of example, one possible application of a logic arrangement according to this invention.

In FIG. 1, the stored program logic includes a data memory 1 that is linked, via a common exchange circuit 2, first to a computer 3, and then via a number of linking circuits Cl . . . Cn, to peripheral equipments P$la$ – P$nk$ . . . P$na$ – P$nk$.

The common exchange circuit 2 sorts and checks the messages coming from the peripheral equipments P$la$ – P$nk$, and writes them into the data memory 1.

The following are examples of messages read from a peripheral equipment via a linking-circuit and stored in the data memory: "The subscriber No. $x$ has an off-hook condition," "There is a received digit," "The connection is established".

At the right time, the common exchange circuit 2 sends these processing orders to the computer 3 which processes them, using the programs stored in its memory. The result of these processing is orders created by the computer. These orders are temporarily stored in the data memory 1, then distributed toward the peripheral equipments P$la$ – P$nk$ by the common exchange circuit 2.

The following are several orders given to the peripheral equipment P$la$ – P$nk$; "What is the state of the extension number $y$ . .?", "Release the extension number $z$.", "Connect the junctor number $p$.. to the operator circuit number $q$ . . ", "Find a free local junctor".

The main peripheral equipments are the extension scanner which manages extensions, the route tester which manages the connection circuit, the auxiliary scanner which manages auxiliaries, that is to say operator circuits and digit receivers, and the junctor scanner which manages junctors. Miscellaneous other peripheral equipments can be added for supplementary facilities: Maintenance, metering, traffic supervision, . . .

Figure 2:
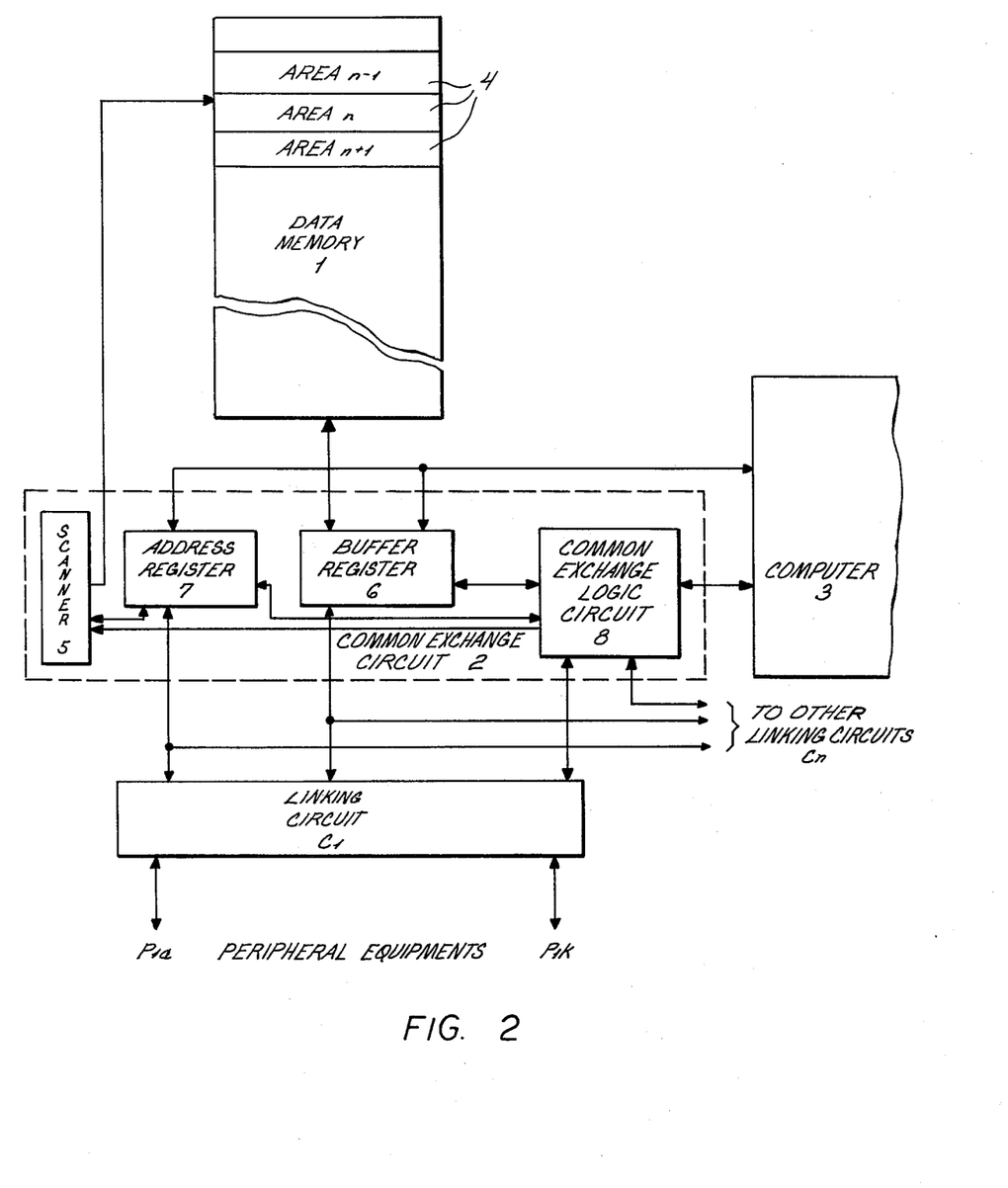
FIG. 2 shows the organization of the data memory and the common exchange circuit.

FIG. 2 is a block diagram of the data memory 1 and the common exchange circuit 2.

The data memory 1 is a conventional random access memory of any known type, such as for example a ferrite core memory or a semiconductor RAM having addressing means. It is divided into several identical areas 4 or field. Each area 4 is composed of several rows of memory 1 and its capacity is enough to store all the information that is required during the establishing of a call, such as for example the number of the dialing receiver used for that call, the number of calling party, the number of a peripheral equipment while it is connected to the logic arrangement, and so on.

An area 4 is associated with any call that is established by the telephone exchange during the time it is being established. The computer 3 and all the peripheral equipments P$nk$ can read in it the information they need for their operation, and write into it other information that they will need later. When the calling party is connected to the called party, it is not necessary to keep this information stored. So, the used area 4 is cleared i.e., all the bits in it become equal to zero. The area becomes free, and it can be chosen to be assigned to another call.

The common exchange circuit 2 includes a scanner 5, a conventional buffer register 6, a conventional address register 7, and a common exchange logic circuit 8.

The scanner can be a binary counter which is sequentially stepped in response to pulses. When it does not receive any order, it addresses the first line of each area 4 successively. Each time it addresses a line, the information written in that line is transferred to the buffer register 6 and the address of the line is written in the address register 7. In a preferred embodiment of the invention, the state (free or not) of each area 4 is written in the last bits of the first line of the corresponding area. So, the state of the area 4 is transferred in the last bits of the buffer register 6. As soon as the information is transferred from the first line of the area 4 to the buffer register 6, the common exchange logic circuit 8 reads the last bits of the buffer register 6. Thus, it knows the state of the addressed area and it can choose the following operation to be done.

For example, if the state of the area 4 is "area calling the computer for a process," the common exchange logic circuit 8 sends the computer 3 a signal informing it that it is needed. The computer 3 sends back a signal indicating whether it is free or not.

In a preferred embodiment of the invention, three wires in BUS connect the common exchange circuit 2 to computer 3. On a first wire, there is a signal 1 or 0 according to whether the computer is busy or free. On a second wire, there is a signal 1 or 0 according to whether the computer is faulty or not. On a third wire, there is a signal 1 or 0 according to whether the operation processed by the computer is finished or not; when the operation is finished, the computer is calling.

If the computer 3 is not free, that is to say it is processing another call, the scanner 5 under control of logic circuit 8 addresses the first line of the following area 4. However, if the commputer is free, the bits in the buffer register 6 and the address register 7 are transferred into the computer 3, then the common exchange logic circuit 8 modifies the state of the area 4. This state becomes "area waiting for an answer from the computer." Then, the common exchange logic circuit 8 orders the scanner to address each line of this area successively. Each time a line is addressed, the bits in it are transferred into the buffer register 6 first, and then into the computer 3. So while it processes a call, the computer 3 has all the information about the call at its disposal, stored in one of its own memories. Then, the scanner 5 addresses the first line of the following area 4, and its cycle goes on.

In a preferred embodiment of the invention, the area states are:

"area calling the computer for a process ordered by an extension scanner (or by another peripheral equipment),"

"area calling an auxiliary scanner (or another peripheral equipment) to send it an order,"

"area waiting for an answer from the route tester number n (or another peripheral equipment),"

"area waiting for an answer from the computer",

"area free,"

"faulty area."

The common exchange circuit 2 can receive only one message at a time, coming from a peripheral equipment. If several linking circuits $Cl-Cn$ simultaneously call the common exchange circuit 2, the latter must choose the call to be received. So, there are priority levels among the peripheral equipments. In a preferred embodiment of the invention, the auxiliary scanners have the highest priority, then the junctor scanners, the charge meters, the route testers, the maintenance and finally the extension scanners that have the lowest priority.

Figure 3:
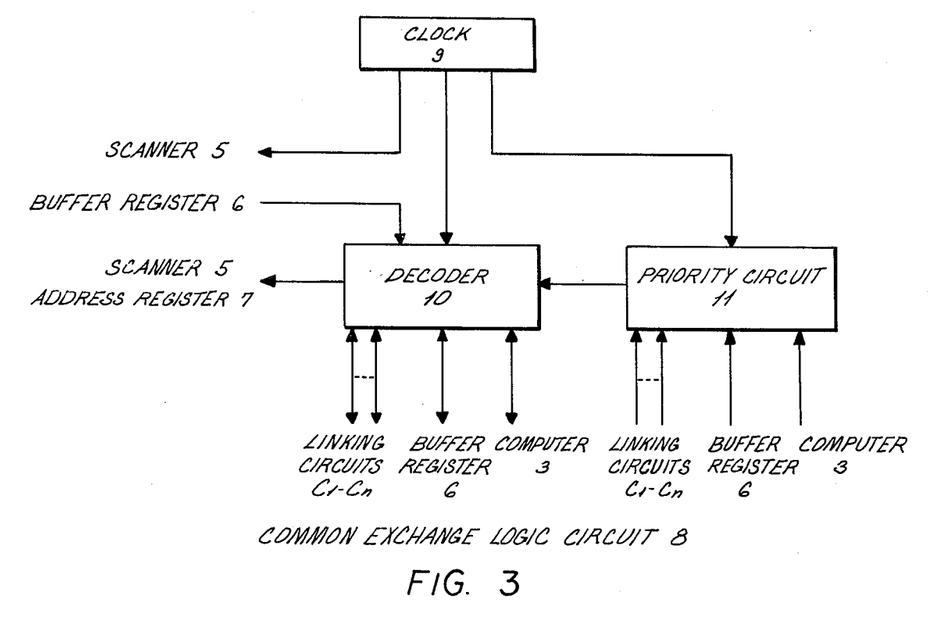
FIG. 3 shows a common exchange logic circuit according to the invention.

FIG. 3 shows a common exchange logic circuit 8 included into a common exchange circuit 2.

The common exchange logic circuit 8 is a logic circuit which is designed in such a manner that it sends a signal to either the computer 3 or one of the linking circuits $Cl - Cn$, according to the value of the binary elements received at the input of the common exchange logic circuit 8, said binary elements being the area state of the concerned area 4. Moreover, the common exchange logic circuit 8 is designed to send orders, in the form of signals, to other elements such as scanner 5, buffer register 6 and address register 7 of the common exchange circuit 2 when the computer 3 or a called linking circuit $Cl - Cn$ answers.

The common exchange logic circuit 8 includes a clock 9, a decoder 10, and a priority circuit 11. The clock 9 synchronizes every part of the data memory 1 and of the common exchange circuit 2 by sending clock signals to the scanner 5, the decoder 10, and the priority circuit 11. If several devices simultaneously call the data memory 1, the priority circuit 11 chooses the first call to be treated, according to a predetermined order. For example, one can choose that any call coming from the computer 3 has a higher priority than any call coming from a linking circuit $Cl - Cn$.

The decoder 10 includes a register, into which the area state is transferred from the buffer register 6, and an electronic logic circuit. The electronic logic circuit is made of gates known per se, such as AND gates or OR gates. These gates are arranged so that the logic circuit sends validation signals to blocks 3, 5, 6, 7, $Cl - Cn$ according to the signals (end of operation, admitted, free circuit,..) it receives from computer 3, buffer register 6 and linking circuits $Cl - Cn$, and according to the area state. Such a logic circuit will be apparent to a man skilled in the art. It is not described in detail here because the precise circuit depends on the specific combinations of bits to be decoded and depends on exchange characteristics, for example the number of linking circuits, that is to say the number of types of peripheral equipments which are mounted in the exchange, or the number of the binary elements chosen for writing the area state, and the code that is chosen for defining said area state.

Figure 4:
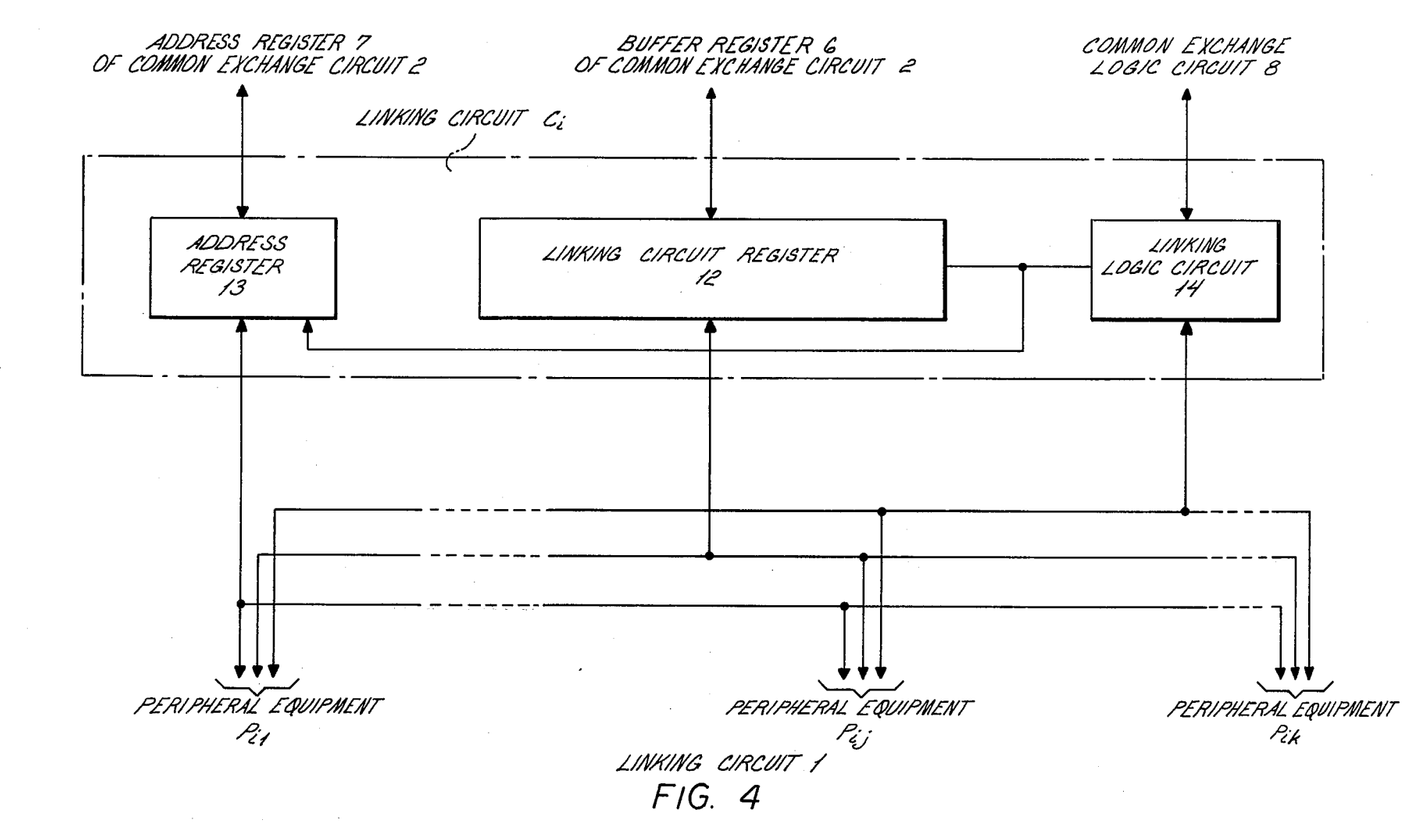
FIG. 4 shows a linking circuit according to the invention.

In FIG. 4, the linking circuit $Ci$ includes a linking circuit register 12, an address register 13, and a linking logic circuit 14.

The linking circuit register 12 which can be a flip-flop array, is connected to the buffer register 6 so that the bits written in the buffer register 6 can be transferred into the linking circuit register 12, and vice-versa. This connection is multipled on each linking circuit register of each linking circuit $Cl - Cn$, but only one linking circuit at a time receives a validation signal from the common exchange circuit 2.

The validation signal is sent by the area state register in decoder 10 included in the common exchange logic circuit 8. It is received by the linking logic circuit 14 which controls the linking circuit register 12. In this manner, information transfer is possible between the buffer register 6 and the linking circuit register 12 of only one linking circuit at a time.

In the same manner, the address register 13 is connected to the address register 7 of the common exchange circuit, so that an address written in one address register can be transferred into the other address register. This connection is multipled on each address register of each linking circuit $Cl - Cn$, but transferring an address is possible between the address register 7 and the address register 13 of only one linking circuit at a time, because the linking logic circuit 14 also controls the address register 13.

All the peripheral equipments $Pil - Pik$ of a same type are connected to the same linking circuit $Ci$. For example, all the extension scanners are connected to the same linking circuit, so that there is only one linking circuit for all the extension scanners.

The linking circuit register 12 and the address register 13 are connected to corresponding registers included in the peripheral equipments $Pil - Pik$. Thus, it is possible to transfer an information from a line of the data memory 1 into a register of a peripheral equipment $Pil - Pik$ via the buffer register 6 and the register 12 of the corresponding linking circuit $Ci$, and vice-versa. The line of the data memory 1 from which the information is transferred, or into which the information is written, respectively, is known. Effectively, its number is written into the address register 7, and it is transferred into the address register of the peripheral equipment via the address register 13 of the linking circuit.

One peripheral equipment processes only one communication at any one time, corresponding to only one area. It stores the number of this area in one of its registers during the whole time it processes the communication. So that when it calls the data memory for sending it information at the end of the processing, it can send the number of the corresponding area and address the data memory.

When the same peripheral equipment processes another communication, it will store another area number.

The linking logic circuit 14 plays a part that is analogous to that of the common exchange logic circuit 8. Like it, it includes logic circuits to send validation signals to the linking circuit register 12, to the address register 13, and either to one chosen peripheral equipment $Pij$, when it receives a validation signal from the common exchange logic circuit 8 or to the common logic circuit 8, when it receives a call signal from a peripheral equipment $Pil - Pik$. Moreover, it includes a priority circuit to choose which call must be treated first, when several peripheral equipments, and eventually the common exchange logic circuit 8, call it simultaneously.

Figure 5:
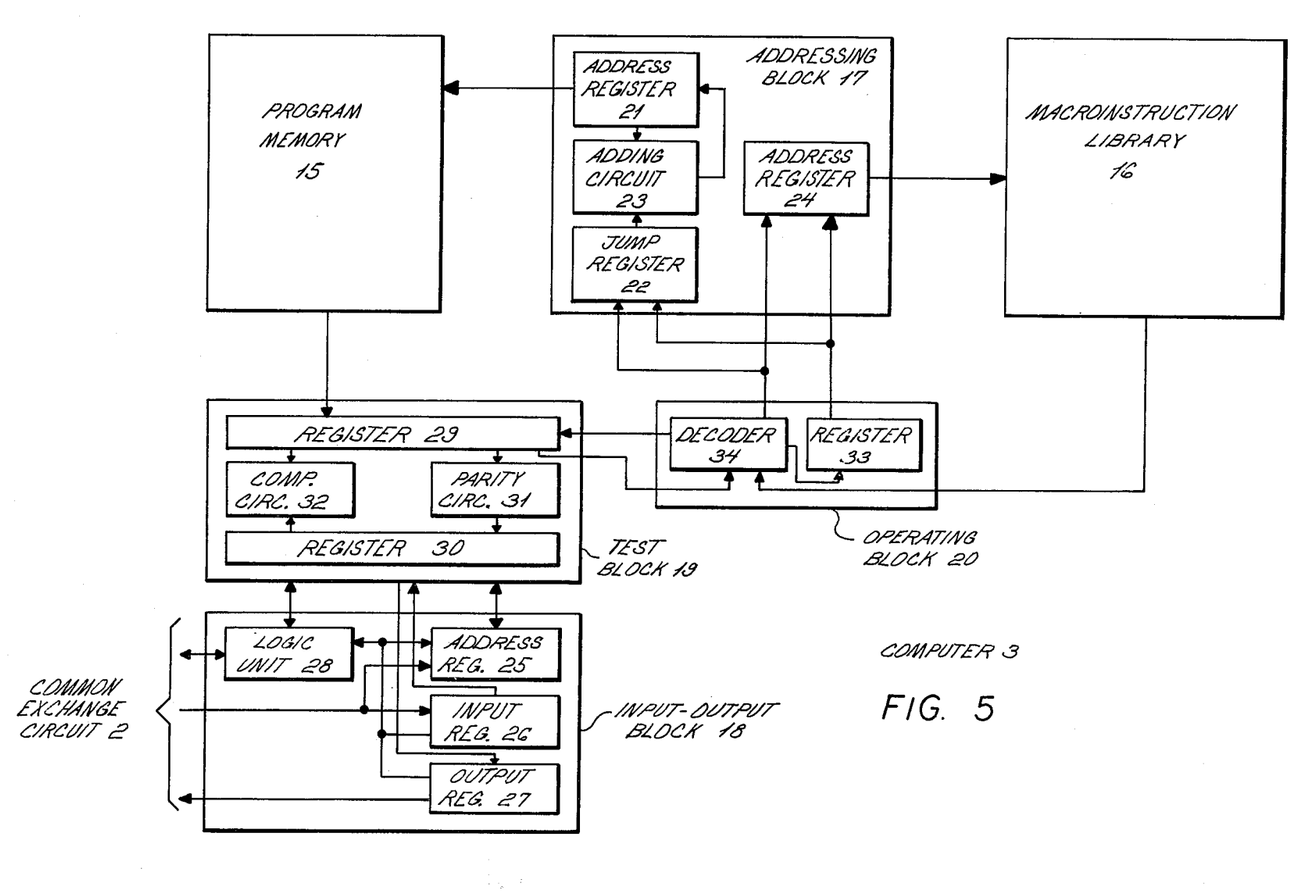
FIG. 5 shows the organization of the computer.

In FIG. 5 the computer 3 includes a program memory 15, a macroinstruction library 16, an addressing block 17, an input-output block 18, a test block 19, and an operating block 20.

The program memory 15 is a random access memory of any known type, for example a ferrite core memory. It contains all the information, programs and tables that are necessary for the running of the installation, and for carrying out the telephone procedures, especially these which depend on the facilities and are particular to each PABX.

The macroinstruction library 16 is either a random access memory, or a programmable read only memory, of any known type, for example a ferrite core random access memory or a semiconductor programmable read only memory. It contains subroutines, especially these which are the same in all the PABXs of this type.

The addressing block 17 is composed of two parts: one for addressing the program memory 15, and the other for addressing the macroinstruction library 16. The first part, which is for addressing the program memory 17, includes: an address register 21 in which the address of the instruction to be executed is stored, a jump register 22 in which is written the number to be added to the contents of the address register 21 for obtaining the address of the following instruction to be executed, and an adding circuit 23 which adds the contents of the address register 21 and of the jump register 22, and sends the results to the address register 21. The second part, which is for addressing the macroinstruction library 16, includes: an address register 24 in which the address of the instruction to be executed is stored.

The information, whether program memory 15 or macroinstruction library 16 is addressed, is stored in the operating block 20 which includes a decoder 34 and a register 33.

The input-output block 18 comprises an address register 25, an input register 26, an output register 27, and a logic unit 28. The computer 3 is connected to any other part of the logic arrangement according to the invention via this input-output block 18.

The input register 26 is an electronic register of any known type, with the same capacity as an area 4 of the data memory 1. When the computer 3 must carry out a process concerning a communication, the information that is stored in the area 4 attributed to this communication is transferred into the input register 26, via the buffer register 6 of the common exchange circuit 2. Previously, the address of this area 4 was transferred from the address register 7 of the common exchange circuit 2 into the address register 25 of the input-output block 18.

Then, the computer 3 carries out the process to be done, using the information stored in the input register 26 of the input-output block 18. The way a process is carried out will be described more in detail later. The result of a process makes it necessary to write supplementary information into the concerned area 4, and to modify information that was previously inscribed. For this purpose, the computer 3 uses its output register 27.

The output register 27 is a register of the same type as the input register 26 and has the same capacity. The computer 3 writes into its output register 27 the new information, and the modified information, at the place they must be written into the concerned area 4. Unchanged information is directly transferred from the input register 26 into the output register 27. So, when the process is finished, the contents of the output register 27 is exactly the new contents of the concerned area 4.

The computer 3 then calls the common exchange circuit 2. The address of the concerned area 4 that remained in the address register 25 during the whole process, is transferred into the address register 7 of the common exchange circuit 2, and an order is given to scanner 5 for addressing that area. Then, the information is transferred from the output register 27 into the addressed concerned area 4, via the buffer register 6.

Transferring information from the common exchange circuit 2 into the input-output block 18 and vice-versa, is controlled by the logic unit 28 of block 18. The logic unit 28 comprises a clock and a priority circuit. The clock is a clock of any known type, which is controlled by the clock of the data-memory that operates with the computer 3, in order to run in synchronism therewith. It transmits sequential signals either toward the common exchange logic circuit 8, toward registers of the input-output block 18, or toward the test block 19. For example, such signals are: acknowledgement of a call from the common exchange circuit 2, actuation of the input register in order to make it possible to write (or to transfer) information into (from) it, end of writing, actuation of a register of the test block 19 in order to make it possible to write into (to transfer from) it information coming from (to be written into) a register of the input-output block 18, call of the common exchange circuit 2, etc. The priority circuit is of any known type. It is needed when there are several common exchange circuits 2 mounted in parallel, each one being connected to a data memory 1, if eventually two or more common exchange circuits 2 call the computer 3 simultaneously. The priority circuit then chooses the common exchange circuit 2 which must be answered first.

When the common exchange circuit 2 calls the computer 3, it sends a call signal to the logic unit 28. The clock of the logic unit 28 begins to run in synchronism with the clock of the common exchange logic circuit 8. Then the logic unit 28 sends a signal to the common exchange logic circuit 8 in order to indicate to it that the computer 3 is free. Then, information can be transferred from the data memory 1 to the input-output block 18 via the common exchange circuit 2. First, the address of the concerned area 4 is transferred from the address register 7 to the address register 25. The logic unit 28 sends validation signals to the address register 25 and to the test block 19, so that the address is transferred from the address register 25 to a register of the test block 19. In block 19, the parity of the address is checked, and the result is sent, as a signal, from test block 19 to the logic unit 28. If the parity is faulty, the transfer of information is cancelled; if the parity is good, the transfer of information goes on.

When the operation is finished, the computer 3 calls the common exchange circuit 2, that is to say the logic unit 28 sends a signal toward the common exchange logic unit 8. When the common exchange circuit 2 is free, its common exchange logic circuit 8 sends an acknowledgement signal to the logic unit 28. When receiving this signal, the logic unit 28 sends a validation signal to the address register 25, then to the output register 27, in order their contents are transferred to the common exchange circuit 2.

The test circuit 19 includes two registers 29 and 30, a parity circuit 31 and a comparison circuit 32.

The registers 29 and 30 have a capacity so that they can contain either a word of the program memory 15 or a word of the data memory 1. The register 29 is a shift register. Its shifts are controlled by subroutines written in the macroinstruction library 16. These subroutines are transferred from the macroinstruction library 16 into the operating block 20, where they are decoded to form shift order signals to be sent to register 29. There are shifts of register 29 when only a part of the information written in the register 29 is needed, for example only a part of an instruction, if the contents of the register 29 come from the program memory 15, or only a particular information, if the contents of the register 29 comes from the input register 26.

The parity circuit 31 is of any known type. It determines the parity bit of a binary information written in the register 29, and writes the parity bit into the register 30, while the contents of the register 29, except the parity bit, is transferred into the register 30. So, when the parity computing is finished, the information written in the register 30 has an exact parity. The comparison circuit 32 is of any known type. It compares the information written in the registers 29 and 30, and so makes it possible to know whether their contents are the same or not. In order to check the parity of an information, the information is written into the register 29, its parity bit is computed in the parity circuit 31, in the manner described above, then the contents of the registers 29 and 30 are compared.

The operating block 20 includes a register 33 and a decoder 34. In the register 33 is written the information whether program memory 15 or macroinstruction library 16 is addressed. This information is written into the register 33 by the decoder 34. The decoder 34 receives program instruction signals from the program memory 15 via the register 29, and subroutine signals from the macroinstruction library 16. The decoder 34 decodes these instructions and sends signals either to the register 29, or to the register 33 and to the jump register 22 or the address register 24, in order to control either shifts in the register 29 or to address the program memory 15 or the macroinstruction library 16.

The program memory 15 and the macroinstruction 16 interwork in the following manner. The program memory 15 contains all the successive programs to be executed for carrying out a telephone procedure. The macroinstruction library 16 includes subroutines which are selected from the programs recorded in the program memory 15. There is a type of instruction in the program memory 15 which is: "Call the macroinstruction number $n$".

Thus, while carrying out a program of program memory 15, if this type of instruction appears, the program in the program memory 15 is stopped, the $n^{th}$ subroutine is executed in the macroinstruction library 16, then the program in the program memory 15 continues from the following instruction.

The role of some subroutines is to arrange the information in the data memory and in the program memory. For arranging the information in the data memory, there are subroutines which make the information picked from input register 26 of the block 18, shifted in the register 29 of the test block 19, and placed at the right place in the output register 27 of block 18. There are other subroutines which cause calculations to be made in order to know the address of the instruction to be read in the program memory.

Figure 6:
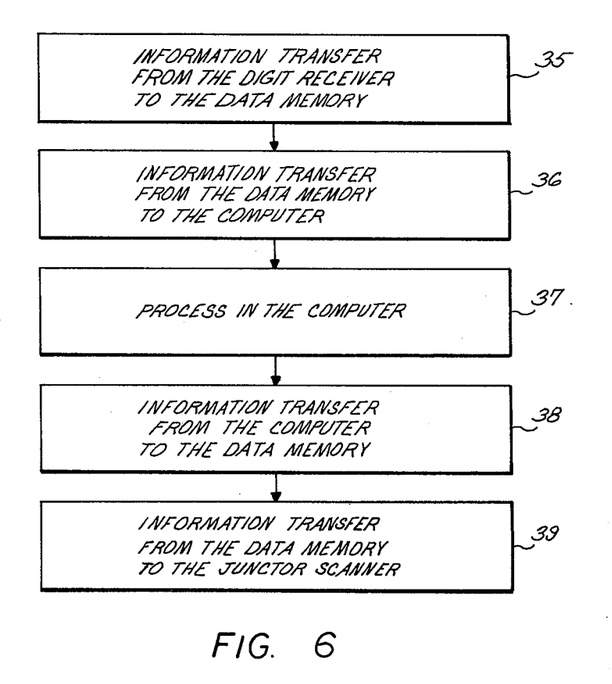
FIG. 6 is a flow chart of an example of operation of the logic arrangement according to the invention.

FIG. 6 shows the flow diagram of an example of operation of the logic arrangement according to the invention. The chosen example is what happens in the logic when a peripheral equipment calls it in order to transmit to it a number dialled by a user.

When the calling party lifted his handset, he heard the dial tone. So he dialled the number of the called party. We assume he has just dialled the last digit of this number.

As soon as he lifted the handset, an area 4 of the data memory 1 was chosen for storing every information concerning the communication. At the moment he dials the last digit of the called number, the following information is already recorded: "the area is waiting for a call from a linking circuit $Ci$," "a subscriber is dialing," so is the number of the dialing subscriber, the number of the digit receiver, and the digits already dialled by the subscriber.

The dialed digit is received and stored in a digit receiver. In step 35, the corresponding peripheral equipment $Pij$ of this digit receiver observes that a digit is received, then it calls the logic arrangement, that is to say it calls the corresponding linking circuit $Ci$, by sending a call signal to the linking logic circuit 14 of the linking circuit $Ci$.

If there is no other call having a higher priority, the linking logic circuit 14 sends an answer signal to the peripheral equipment $Pij$, allowing it to transfer information. So, the following information is written into the address register 13 and the linking circuit register 12: the address of the concerned area in the data memory 1 (this address was already stored in a register of the peripheral equipment $Pij$), and the information: "there is a received digit," the digit received, and the number of the digit receiver.

The linking logic circuit 14 then sends a call signal to the decoder 10 and the priority circuit 11 of the common exchange logic circuit 8 included in the common exchange circuit 2. If there is no other call having a higher priority, the call from the linking circuit is decoded, and an answer signal, allowing the transfer of information is sent back from the decoder 10 to the linking logic circuit 14 of the linking circuit $Ci$.

The linking logic circuit 14 sends a read actuation signal to the address register 13. Simultaneously, the decoder 10 sends a write actuation signal to the address register 7. As soon as these actuation signals are received, the address is transferred. The decoder 10 then sends a signal to the scanner 5 for ordering it to stop the scanning of the data memory 1 and to directly address the area 4, the address of which is written in address register 7. Simultaneously, it sends a write actuation signal to the buffer register 6. The information written in the first line of the addressed area is transferred into the buffer register 6. The zone state of the area then is transferred into the decoder 10. If the zone state is "the area is waiting for a call from linking circuit $Ci$," there is no mistake. So, the decoder 10 sends a signal to the linking logic circuit 14 of the linking circuit $Ci$.

The linking logic circuit 14 sends a read actuation signal to the linking circuit register 12. Simultaneously, the decoder 10 sends a write actuation signal to the buffer register 6. As soon as these actuation signals are received, the information is transferred into the buffer register 6. Then the buffer register 6 sends an acknowledgement signal to the decoder 10. The decoder 10 sends a read actuation signal to the buffer register 6, and the information is transferred into the area 4. The decoder 10 then writes into the buffer register 6 the new area state: "the area is waiting for the computer to perform an operation ordered by the linking circuit $Ci$". The new area state is transferred into the first line of the addressed area 4. The decoder 10 then sends a signal to the scanner 5 for ordering it to start again the scanning of the data memory 1.

In step 36, during the scanning of the data memory 1, the concerned area 4 is addressed again, and its area state is written into the decoder 10. The buffer register 6 calls the priority circuit 11. If there is no other call having a higher priority, and if the computer 3 is free, the decoder 10 sends a call signal to the computer 3. The call signal is received by the logic unit 28 of input-output block 18. As an answer, the logic unit 28 sends an acknowledgement signal to the decoder 10. The decoder 10 then sends a read actuation signal to the address register 7, at the same time that the logic unit 28 sends a write actuation signal to the address register 25. The address of the concerned area then is transferred from the address register 7 to the address register 25.

The address of the area includes a parity bit. So, the parity of the address is first checked. By sending actuation signals, the logic unit 28 causes the parity of the address transferred from the address register 25 to the register 29 to be checked in the above described way, using the register 30, the parity circuit 31, and the comparison circuit 32. In the normal case, the comparison circuit 32 sends the logic unit 28 a signal to inform it that the parity is not faulty. The logic unit 28 then sends a signal to the decoder 10.

The decoder 10 sends a read actuation signal to the buffer register 6, at the same time that the logic unit 28 sends a write actuation signal to the input register 26. The contents of the first line of the concerned area 4, which were written in the buffer register 6, is then transferred into the input register 26. The decoder 10 then modifies the area state that is written in the last bits of the buffer register 6, by writing in a coded way the new area state: "the area is waiting for an answer from the computer".

The decoder 10 now sends a write actuation signal to the buffer register 6, and a signal to the scanner 5 which then addresses the second line of the same area 4. The information so written in this second line is transferred into the buffer register 6. The decoder 10 sends a read actuation signal to the buffer register 6, at the same time that the logic unit 28 sends a write actuation signal to the input register 26. So the contents of the second line of the concerned state 4 is transferred into the input register 26. The same operation is repeated as many times as necessary, so that the contents of the whole area 4 is written into the input register 26.

In step 37, while every useful information is written in the input register 26, the logic unit 28 addresses the first line of the program memory 15, via the test block 19 and the decoder 34 of the operating block 20. The instruction which is written in the first line of the program memory 15 is the first instruction of a program which is provided for reading a table stored in the program memory 15. In this table, every combination of the three following pieces of information is registered: the state of the communication, the number of the calling linking circuit, and information called "supplementary information".

In the chosen example, the state of the communication is "selection". The number of the calling linking circuit is the code number of the linking circuit which is associated with the peripheral equipments which observe the dialing receivers. The supplementary information is: "a dialing has been just received". These three main information units were written in the above mentioned area 4 of the data memory 1, and they were transferred into the input register 26 of the input-output block 18. When the reading of the table begins, the three main information units are transferred into the register 30 of the test block 19. Each word of the table written in the program memory 15 is transferred into the register 29 at the time it is read, and it is compared to the contents of the register 30, by using the comparison circuit 32.

An information unit about the address of the program to be processed for carrying out the telephone procedure is written in the table of the program memory 15 at a place that is associated to the corresponding combination of the three main informations. So, each time the contents of the registers 29 and 30 are compared, a signal is sent to the decoder 34 to inform it of the result of the comparison. If the contents are different, the decoder 34 writes into the register 33 that the program memory 15 must be addressed again, and it writes "1" in the jump register 22. The contents of the jump register 22 and of the address register 21 are added in the adding circuit 23, and the result of the addition is written into the address register 21, so that the next combination in the table is addressed.

When the contents of the registers 29 and 30 are the same, the information about the address of the program to be processed is sent to the decoder 34. The decoder 34 decodes this information, writes into the register 33 that the program memory 15 must be addressed again, and writes into the jump register 22 the number to be added to the address presently written in the address register 21 in order to obtain the address of the first instruction of the program to be processed. The addition is made in the adding circuit 23 and then the first instruction is read.

Each time an instruction is read, it is transferred into the register 29 and a signal is sent to the decoder 34 to indicate whether the next instruction must be read, or whether a macroinstruction is called. If the instruction must be read, the decoder 34 writes in the register 33 that the program memory 15 must be addressed, and it writes 1 in the jump register 22. If a macroinstruction is called, the decoder 34 writes the address of the concerned macroinstruction in the address register 24, and writes in the register 33 that the macroinstruction library 16 must be addressed.

Each time a macroinstruction is addressed, it is sent to the decoder 34. The decoder 34 carries out the orders included in the macroinstruction, generally shift orders to be applied to the register 29 for moving an information. Then the decoder 34 writes into the register 33 whether the program memory 15 or the macroinstruction library 16 must be addressed, and writes an address either into the jump register 22, or into the address register 24, according to the information included in the read macroinstruction.

The result of the program is information about the next operation to be carried out. Each information unit is first written into the register 29, moved to be placed at the right place in a line, then transferred into the right line of the output register 27.

In the chosen example, the next operation to be carried out is finding a free junctor. The first information unit to be written in the output register 27 is the linking circuit to be called, that is to say the code number of the linking circuit associated with the junctor scanners. The second information unit to be written in the output register 27 is the "supplementary information," that is to say the order to be given to the junctor scanners: "Find a free junctor". In order to complete this "supplementary information" with the type of junctor to be chosen, there is a subprogram included in the above mentioned program, for analysing the called number. Thus, the called number is transferred from the input register 26 into the register 30 so that it can be compared with information included in the subprogram instructions. The type of junctor, that is to say whether it is a local connecting circuit or a trunk circuit, and the route it belongs to, are determined according to the first digits of the called number. The type and the route of the junctor are written into the output register 27 in the same manner as the above mentioned informations.

The last instruction of the program sends a signal to the logic unit 28 for informing it that the program is finished. Then the logic unit 28 sends validation signals to the input register 26, to the output register 27, and to the test block 19, for transferring all the information that has not been changed from the input register 26 into the output register 28 via the test block 19. The information that has not been changed is all the information that was written in the input register 26, except the number of the linking circuit and the supplementary information. The information is put in the output register 27 at the same place as it was written in the input register 26. So the contents of the output register 27 is exactly the new contents of the area 4.

In step 38, when the writing in the output register 27 is finished, the logic unit 28 sends a call signal to the common exchange logic circuit 8 of the common exchange circuit 2. The call signal is received by the decoder 10 and the priority circuit 11. If there is no other call having a higher priority, the priority circuit 11 sends a signal to the decoder 10, and the call from the computer 3 is decoded. So the decoder 10 sends a signal to the scanner 5 to stop the scanning of the data memory 1, and it sends back to the logic unit 28 an answer signal that allows the transfer of information.

The logic unit 28 sends a read actuation signal to the address register 25 of the input-output block 18. Simultaneously, the decoder 10 sends a write actuation signal to the address register 7. As soon as these actuation signals are received, the address is transferred. The decoder 10 then sends a signal to the scanner 5 for ordering it to directly address the first line of the area 4, the address of which is now written in the address register 7.

The logic unit 28 sends a read actuation signal to the first line of the output register 27, at the same time that the decoder 10 sends a write actuation signal to the buffer register 6. The contents of the first line of the output register 27 is transferred into the buffer register 6. Then the decoder 10 sends a write actuation signal to the buffer register 6, and the contents of the latter is transferred into the first line of the concerned area 4.

The decoder 10 then sends a signal to the scanner causing it to address the second line of the same area 4. The contents of the second line of the output register 27 is then transferred into the second line of the area 4, via the buffer register 6, in the same way as described above for the first line. Then the whole contents of the output register 27 is transferred into the concerned area 4, line by line, in the same way. As soon as the contents of the last line have been transferred, the decoder 10 sends a signal to the scanner 5 for ordering it to start again the scanning of the data memory 1. The area state of the concerned area 4 presently is "area calling a junctor scanner."

In step 39, during the scanning of the data memory 1, the concerned area 4 is addressed again, and its area state is written into the decoder 10. The buffer register 6 calls the priority circuit 11. If there is no other call having a higher priority, the priority circuit 11 sends a signal to the decoder 10, and the latter calls the linking circuit Cj that corresponds to the junctor scanners.

The call signal is received by the linking logic circuit 14 of the linking circuit Cj. If the linking circuit Cj is free, that is to say if there is no other call having a higher priority, the linking logic circuit 14 sends an acknowledgement signal to the decoder 10.

The decoder 10 sends a read actuation signal to the address register 7 and to the buffer register 6 at the same time that the linking logic circuit 14 sends a write actuation signal to the address register 13 and to the linking circuit register 12, respectively. So, the address of the concerned area, and the contents of the first line of the area, are transferred from the common exchange circuit 2 into the linking circuit Cj.

The information to be transferred into the scanner junctor are the order: "Find a free junctor" and the type and route of the junctor to be found. This information is written in a predetermined place in the area 4, for example in the third line of the area 4. In such an example, all the information to be transferred from the area 4 into a junctor scanner and vice-versa is always written in the third line of the area 4. So the contents of the third line are transferred each time there is an information transfer between a junctor scanner and the logic unit according to the invention, in the following manner. As soon as the address and information is transferred into the registers of the linking circuit Cj, the linking logic circuit 14 sends to the decoder 10 an order signal for addressing third line of the area 4. The decoder 10 sends in turn to the scanner 5 an order signal for addressing the third line of the concerned area 4, and at the same time it sends a write actuation signal to the buffer register 6. The contents of the third line of the area 4 is transferred into the buffer register 6. Then it is transferred into the linking circuit register 12 in the same way as described above.

When all the useful information is written in the linking circuit Cj, the latter calls a junctor scanner. The call signal is received by a logic circuit included in the junctor scanner. If the junctor scanner is free, its logic circuit sends back an acknowledgement signal. In the other case, it answers that it is not free, and the linking circuit Cj calls another junctor scanner, and so on until a junctor scanner answers it is free.

Then the information is transferred from the linking circuit Cj into the free junctor scanner, line by line, in a way that is analogous to the above described ways. As soon as the transfer is finished, the junctor scanner begins to execute the order.

What is claimed is:

1. A stored program logic system for use with a plurality of peripheral equipments comprising: a data memory (1) having a plurality of addressed fields (4) for storing processable data, a common exchange means including scanning means (5) for selecting fields of said data memory, an exchange address register (7) for storing the address of the field to be selected by said scanning means, an exchange buffer register (6) connected to said data memory for receiving data from or transferring data to said data memory and exchange control (8) means for controlling the reception and transmission of addresses and data by said register; a linking means for interfacing the peripheral equipments with said common exchange means including a linking address register (13) connected to said exchange address register for receiving and storing an address therefrom or transferring thereto an address stored in said linking address register, a linking circuit register (12) connected to said exchange buffer register for receiving and storing data therefrom and for transferring thereto data stored in said linking circuit register, said linking circuit register being connectable to peripheral equipments for receiving data therefrom and transferring data thereto, and linking control means (14) for controlling the transmission and reception of addresses and data by said registers; and a computer, said computer comprising means for processing data (15, 16, 17, 19), a computer address register means (25) connected to said exchange address register for receiving and storing addresses therefrom and transferring thereto addresses stored in said exchange address register, computer buffer register means (26, 27) for receiving data from and transferring data to said exchange buffer register, and computer control means for controlling the transmission and reception of addresses and data by said register means.

* * * * *